United States Patent [19]

Pielartzik et al.

[11] Patent Number: 5,086,102
[45] Date of Patent: Feb. 4, 1992

[54] MIXTURES OF POLY(ARYLENE SULPHIDES), MALEAMIDIC ACIDS AND GLASS FIBRES

[75] Inventors: Harald Pielartzik; Burkhard Köhler, both of Krefeld, Fed. Rep. of Germany; Hans-Joachim Traenckner, Merksem, Belgium; Wolfgang Jakob, Moers; William C. Bushong, Krefeld, both of Fed. Rep. of Germany

[73] Assignee: Bayer Aktiengesellschaft, Leverkusen, Fed. Rep. of Germany

[21] Appl. No.: 548,601

[22] Filed: Jul. 5, 1990

[30] Foreign Application Priority Data

Jul. 18, 1989 [DE] Fed. Rep. of Germany ....... 3923658

[51] Int. Cl.$^5$ ................................................. C08K 5/54
[52] U.S. Cl. .................................. 524/188; 524/219; 524/495
[58] Field of Search ................. 524/219, 188, 495

[56] References Cited

U.S. PATENT DOCUMENTS

| | | | |
|---|---|---|---|
| 3,308,090 | 3/1967 | Falcone et al. | 524/219 |
| 3,940,360 | 2/1976 | Carder | 514/188 |
| 4,743,639 | 5/1988 | Liang | 524/188 |
| 4,788,310 | 11/1988 | Stein et al. | 524/188 |
| 4,935,473 | 6/1990 | Fukuda et al. | 514/188 |

FOREIGN PATENT DOCUMENTS

| | | |
|---|---|---|
| 0330488 | 8/1989 | European Pat. Off. . |
| 370551 | 5/1990 | European Pat. Off. . |
| 55-29526 | 3/1980 | Japan . |
| 01-101366 | 4/1989 | Japan . |

OTHER PUBLICATIONS

WPIL, File Supplier, AN89-150451, Derwent Pub. Ltd; & JP-A-1 101 366 (1989).
WPIL, File Supplier, ASN89-203151, Derwent Publ. Ltd.; & JP-A-0 330 488 (1989).
Patent Abstracts of Japan, 12:496 (C-555) [3343]; 1988; & JP-A-63 205 357 (1988).

*Primary Examiner*—Veronica P. Hoke
*Attorney, Agent, or Firm*—Conolly & Hutz

[57] ABSTRACT

The invention relates to mixtures of poly(arylene sulphides), glass fibres and maleamidic acids, which are remarkable for good mechanical properties and an increased melt viscosity of the matrix resin.

7 Claims, No Drawings

MIXTURES OF POLY(ARYLENE SULPHIDES), MALEAMIDIC ACIDS AND GLASS FIBRES

The invention relates to mixtures of poly(arylene sulphides), glass fibres and maleamidic acids, which are remarkable for good mechanical properties and an increased melt viscosity of the matrix resin.

Poly(arylene sulphides) (PAS) are known (e.g. U.S. Pat. No. 3,354,129, EP-A 171 021). They are inert thermoplastics, stable at high temperatures, which permit a high degree of filling, e.g. with glass fibres and/or other inorganic fillers. The use of these polymers, especially of poly(phenylene sulphide) (PPS) is increasing in areas which were previously reserved for thermoset plastics.

PAS have unsatisfactory mechanical properties for some applications in the injection moulding field. In particular, the edge fibre extension and impact resistance are not sufficient in practice. It has therefore proved to be advantageous to improve PAS with respect to the properties mentioned, e.g. by blending with other thermoplastics.

Blends of poly(arylene sulphides) with polycarbonates are known (e.g. JP-A 51-59952, EP-A 104 543, U.S. Pat. No. 4 021 596).

For certain fields of application, however, the property profile of such blends is still not entirely satisfactory.

It is known, furthermore, that PAS can be modified in their properties by blending with maleimides. Usually a branching of the PAS at the same time is sought, either by reacting PAS under oxidative conditions with maleimides (JP-A 021 876, 3.2.87) or by reacting PAS with compounds which contain at least three maleimide groups and a triazine ring (e.g. JP-A 202 162-87, EP-A 105 639). Mixtures of poly(arylene sulphides) and maleimides are known, e.g. from EP-A 275 001.

Maleimides, especially those from diamines, can often be synthesized only with difficulty. Desirable therefore would be PAS modifiers which are easily accessible and improve the melt viscosity and/or the mechanical properties of PAS, and preferably PPS.

It has now been found that mixtures of poly(arylene sulphides) (PAS), preferably poly(phenylene sulphide) (PPS) with amidic acids of maleic acid and possibly glass fibres and/or other additives are remarkable for their mechanical properties and an increased melt viscosity.

The subject matter of the invention is therefore mixtures consisting of

A) 99.9 to 20 wt. %, preferably 90 to 20 wt. % poly-(arylene sulphides), especially poly(phenylene sulphide), 0.1 to 40 wt. %, preferably 0.5 to 5 wt. % of an amidic acid of formula (I) and/or (II),

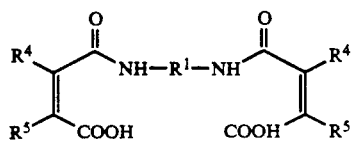

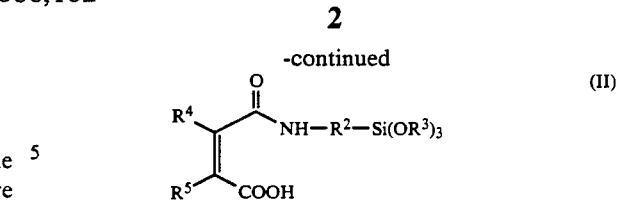

where $R^1$ is a divalent group, which contains 1 to 38 aliphatic carbon atoms, which can also be arranged in cycloaliphatic rings, and/or 6 to 24 aromatic carbon atoms, which are arranged in 1 to 4 aromatic rings, where, for compounds containing 2 or more aromatic rings, these can be linked by a chemical bond, an oxygen atom, a sulphur atom, a carbonyl group or a sulphone group, $R^2$ is a $C_1$–$C_{10}$ alkylene group, preferably a propane-1,3-diyl group or a phenylene group, $R^3$ is a $C_1$–$C_6$ alkyl group or a $C_6$–$C_{14}$ aryl group and $R^4$ and $R^5$ can be the same or different and signify hydrogen, $C_1$–$C_{22}$ alkyl, preferably methyl, $C_6$–$C_{14}$ aryl, preferably phenyl, and especially hydrogen, C) 0 to 79.9 wt. %, preferably optionally 9.9 to 79.9 wt. % of glass fibres and/or other mineral or organic fillers and reinforcing substances and/or inorganic or organic auxiliaries.

Examples of the substances of formula (I) according to the invention are amidic acids derived from maleic acids and diamines, e.g. from maleic acid and hexamethylenediamine, m-phenylenediamine, 2,4- and 2,6-toluylenediamine, p-phenylenediamine, 1,4-diaminocyclohexane, bis(4-aminophenyl)methane, ethylenediamine, 4,4'-diaminodiphenyl ether, 3,3'- and 4,4'-diaminodiphenyl sulphone, 4,4'-diaminodiphenyl sulphide, 4,4' and 3,3'-diaminobenzophenone, benzidine, 3,3'-dimethylbenzidine, isophoronediamine, 1,4-diaminobutane, bis(4-aminocyclohexyl)methane and 2,2,-bis-(4-aminophenyl)propane.

An example of substances of formula (II) according the invention is the amidic acid of maleic acid with 1-amino-3-triethoxysilyl-propane.

The maleamidic acids of formulae (I) and (II) which can be used according to the invention are known and can be produced analogously to known methods from maleic acids and corresponding amines, e.g. in accordance with EP-A 318 162.

The maleamidic acids of formulae (I) and (II) can isomerize to the corresponding fumaramidic acids.

According to the invention ordinary commercial glass fibres, possibly sized in the usual way, are used. They have a diameter of 1 to 20 microns, preferably from 1 to 10 microns. Filaments can also be used and/or production processes chosen for which the length of the fibres in the final mixture is 0.05 to 10 mm, preferably 0.1 to 2 mm. Filaments (rovings) can also be used in processes for the production of filament-reinforced unidirectional composite material.

Optionally also usable—especially in part—instead of glass fibres are ordinary commercial glass spheres, e.g. Ballotini glass spheres.

As other mineral fillers or additives, mention may be made of mica, talc, quartz flour, metal oxides and sulphides such as e.g. $TiO_2$, $ZnO$, $ZnS$, graphite, carbon black, fibres, e.g. of quartz or carbon, carbonates such as e.g. $MgCO_3$, $CaCO_3$, or sulphates such as e.g. $CaSO_4$ and $BaSO_4$.

As further usual additives may be added pigments, demoulding additives, E-waxes, flow aids, nucleating agents or stabilizers.

The mixtures according to the invention can be produced in the usual way by extrusion.

The mixtures according to the invention can be processed in the usual way to mouldings, semi-finished products, fibres, films, profiles etc. The mixtures according to the invention can in general be used advantageously where thermoplastically processable compositions are used.

We claim:

1. Mixture containing
A) 99.9 to 20 wt. % poly(arylene sulphides) and
B) 0.1 to 40 wt. % of an amidic acid of formula (I) or (II) or both,

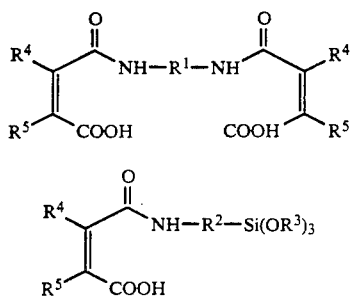

where $R^1$ is a divalent radical selected from the group consisting of 1 to 38 aliphatic radicals, one or more cycloaliphatic rings having a total of up to 38 carbon atoms in the rings, one or more aromatic rings having a total of from 6 to 24 carbon atoms and where 2 or more aromatic groups are present, they can be linked by a chemical bond, an oxygen atom, a sulphur atom, a carbonyl group or a sulphone group, $R^2$ is $C_1$–$C_{10}$ alkylene group or a phenylene group, $R^3$ is a $C_1$–$C_6$ alkyl group or a $C_6$–$C_{14}$ aryl group and $R^4$ and $R^5$ is each the same or different and represents hydrogen, $C_1$–$C_{22}$ alkyl, or $C_6$–$C_{14}$ aryl.

2. A mixture according to claim 1 wherein the amount of A) is 90 to 20 wt. % of the mixture.

3. A mixture according to claim 1 wherein A) is poly (phenylene sulphide).

4. A mixture according to claim 1 wherein the amount of B) is 0.5 to 5 wt. % of the mixture.

5. A mixture according to claim 1 wherein component B) comprises an amidic acid of formula (II) wherein $R^2$ is a propane-1,3-diyl.

6. A mixture according to claim 1 wherein component B) is an amidic acid of the formula (I) or (II) wherein at least one of $R^4$ and $R^5$ is methyl.

7. Molded articles comprising the mixture claimed in claim 1.

* * * * *